(12) United States Patent
Masaki

(10) Patent No.: US 6,318,486 B2
(45) Date of Patent: *Nov. 20, 2001

(54) HYBRID VEHICLE

(75) Inventor: Ryoso Masaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/778,803

(22) Filed: Feb. 8, 2001

Related U.S. Application Data

(63) Continuation of application No. 09/313,346, filed on May 18, 1999.

(30) Foreign Application Priority Data

May 18, 1998 (JP) .................................................. 10-135515

(51) Int. Cl.$^7$ ...................................................... B60K 6/04
(52) U.S. Cl. ........................ 180/65.2; 180/65.8; 701/68; 477/6
(58) Field of Search ................................ 192/84.1, 30 W; 701/34, 67, 68; 180/65.1, 65.2, 65.3, 65.4, 65.8; 477/6, 13

(56) References Cited

U.S. PATENT DOCUMENTS

| 5,343,970 | * | 9/1994 | Severinsky | 180/65.2 |
| 5,786,640 | * | 7/1998 | Sadai et al. | 180/65.2 X |
| 5,909,094 | * | 6/1999 | Yamada et al. | 701/67 X |
| 5,964,675 | * | 10/1999 | Shimada et al. | 701/67 X |
| 5,993,350 | * | 11/1999 | Lawrie et al. | 701/67 X |
| 6,003,626 | * | 12/1999 | Ibaraki et al. | 180/65.2 |
| 6,035,984 | * | 3/2000 | Kosik et al. | 701/67 X |
| 6,041,877 | * | 3/2000 | Yamada et al. | 180/65.2 |

FOREIGN PATENT DOCUMENTS

| 8-98322 | 4/1996 | (JP) . |
| 9-74609 | 3/1997 | (JP) . |

* cited by examiner

Primary Examiner—Michael Mar
(74) Attorney, Agent, or Firm—Crowell & Moring LLP

(57) ABSTRACT

In a series-parallel hybrid vehicle, a check is made to see if there is any trouble of a clutch such as slip or overheating in an engaged state of the clutch, and upon detection of a clutch trouble, the vehicle is driven in accordance with a series hybrid type to prevent driving characteristics from being deteriorated by the clutch trouble.

1 Claim, 4 Drawing Sheets

HYBRID VEHICLE

This application is a continuation of 09/313,346, filed May 18, 1999.

BACKGROUND OF THE INVENTION

The present invention relates to a hybrid vehicle using a generator, a motor and an electric energy storage means to realize a low fuel consumption drive by an engine.

As a drive system which can attain a low fuel consumption of an engine for driving a vehicle, there is known a hybrid type which utilizes a driving force of a motor. The hybrid type is classified into a series hybrid type wherein a vehicle is driven by a motor using a generated output of a generator driven by an engine and a parallel hybrid type wherein a driving force generated by an engine and a driving force generated by a motor are combined together mechanically to drive a vehicle. Also known is a series-parallel type as a combination of both such series hybrid type and parallel hybrid type.

For example, in Japanese Patent Laid-open No. Hei 8-98322 there is disclosed a series-parallel hybrid type wherein, in a low-speed vehicular running, the clutch is released, or turned off, whereby the driving mode becomes a series hybrid mode. In the series hybrid mode, an engine can be operated in a high efficiency to generate electric power by increasing the engine speed. While the vehicle is running at a high speed, a parallel hybrid mode is selected by engaging the clutch, or turning on the clutch, thereby permitting a highly efficient operation by the engine. Further, in this conventional type, for preventing a frequent, intermittent on-off operation of the clutch, there is adopted a method wherein a mode switching vehicle speed is given hysteresis.

SUMMARY OF THE INVENTION

In such a conventional type, if stop or acceleration or deceleration is performed frequently when the vehicle is running in a city for example, the vehicle speed repeats increase and decrease more frequently in the vicinity of a medium speed and therefore the number of intermittent clutch switching operations increases even if the mode switching vehicle speed is given hysteresis.

As the clutch repeats its intermittent switching operation, a friction disc thereof wears more and more, so that the coupling force thereof decreases. Once the coupling force of the clutch decreases, it becomes no longer possible to transmit driving and braking forces generated by an engine to wheels effectively and hence no longer possible to obtain an accelerating or decelerating force required by the driver of the vehicle, thus giving rise to the problem that the driving characteristics are deteriorated.

It is an object of the present invention to prevent the driving characteristics from being deteriorated by some trouble of the clutch.

According to the present invention, there is provided a hybrid vehicle including an engine for generating a driving energy for the vehicle, a clutch for making and breaking the transfer of a mechanical driving force between the engine and wheels, a generator which is driven by the engine to generate electric power, an electric energy storage means for storing a generated output of the generator, a motor which generates mechanical driving and braking forces for the wheels through input and output of energy in the electric energy storage means, a controller for controlling these components of the vehicle, and a clutch trouble detecting means for detecting a trouble of the clutch, the controller making control so as to lighten the load of a mechanical driving force transfer imposed on the clutch when the clutch trouble detecting means has detected a trouble of the clutch.

BRIEF DESCRIPTION OF THE DRAWINGS

FIGS. 4A and 4B are driving force-vehicle speed characteristic diagrams each showing a range of operation points for deciding an ideal mode on the basis of a driving condition, of which FIG. 4A is a driving force-vehicle speed characteristic diagram obtained when mode M is a series mode and FIG. 4B is a driving force-vehicle speed characteristic diagram obtained when mode M is a parallel mode.

DESCRIPTION OF THE PREFERRED EMBODIMENT

An embodiment of the present invention will be described hereinunder with reference to the accompanying drawings.

Figure 1:
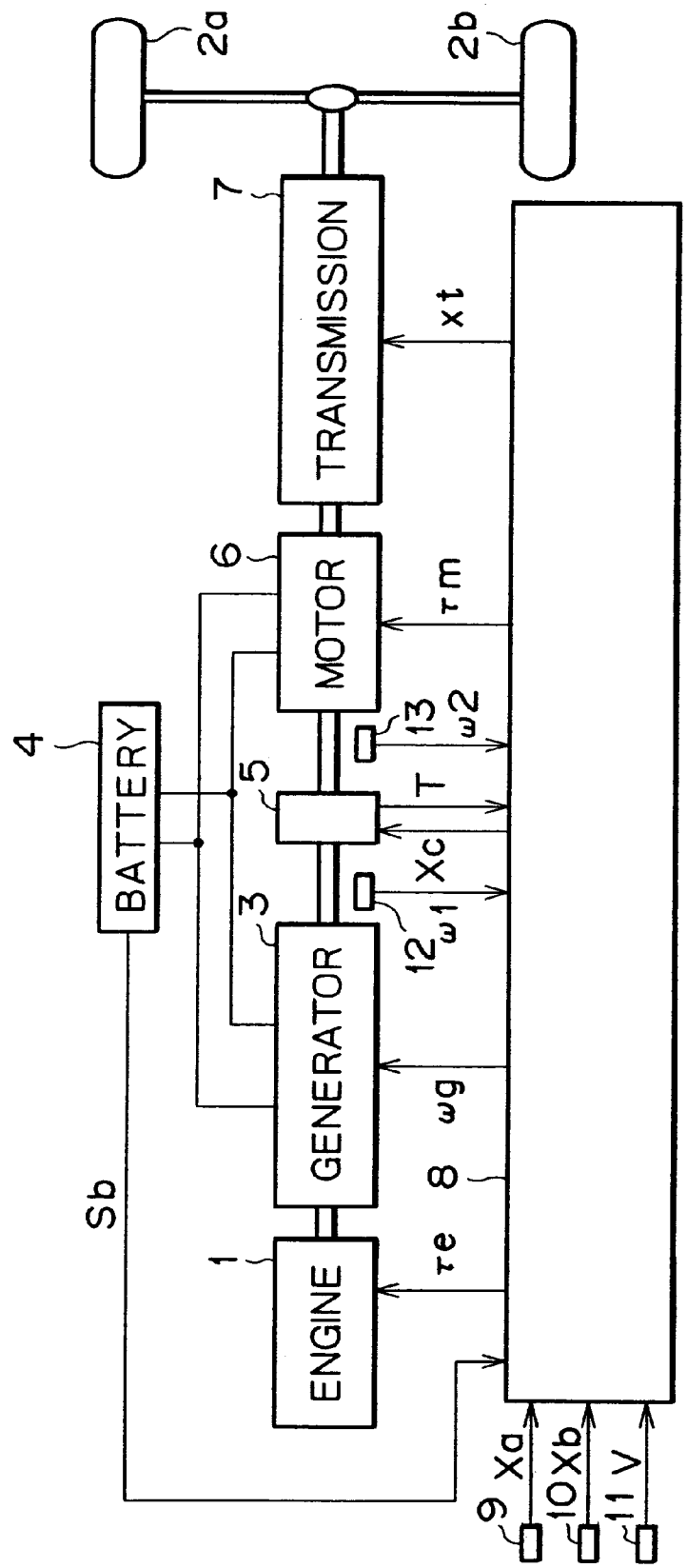
FIG. 1 is a block diagram of a hybrid vehicle of a series-parallel hybrid type according to an embodiment of the present invention.

FIG. 1 shows a hybrid vehicle of a series-parallel hybrid type wherein energy generated by an engine 1 is used directly or indirectly to rotate wheels 2a and 2b, thereby driving a vehicle body. By turning on a clutch 5, a torque generated by the engine 1 is transmitted to an input shaft of a transmission 7 and the wheels 2a and 2b are rotated with a transmission output torque proportional to a speed ratio in the transmission 7.

A generator 3 is mounted on a shaft extending between the engine 1 and the clutch 5. All or a portion of a rotational energy generated by the engine 1 is converted to an electric energy by the generator 3, which electric energy is utilized for charging a battery 4 or utilized as electric power for operating a motor 6.

Since the motor 6 is mounted on a shaft extending between the clutch 5 and the transmission 7, the torque generated by the engine 1 and transmitted to the motor 6 through the clutch 5 and the torque generated by the motor 6 are added together into an input torque to the transmission 7.

A controller 8 inputs an accelerator depression quantity Xa, a brake depression quantity Xb and a vehicle speed V which are provided from an accelerator sensor 9, a brake sensor 10 and a vehicle speed sensor 11, respectively. The controller 8 further inputs a charge quantity Sb which indicates a charging condition of the battery 4, rotational speeds $\omega 1$ and $\omega 2$ of input and output shafts of the clutch 5, and a clutch temperature T of the clutch 5. The rotational speeds $\omega 1$ and $\omega 2$ are detected by speed sensors 12 and 13, respectively, and the clutch temperature T is detected by a temperature sensor (not shown) incorporated in the clutch.

On the basis of these input signals, the controller 8 outputs an engine torque command value $\tau e$ indicating a torque to be generated by the engine 1, a generator speed command value $\omega g$ indicating a rotational speed of the generator 3, a clutch command value Xc indicating an on or off condition of the clutch 5, a motor torque command value $\tau m$ indicating a torque to be generated by the motor 6, and a speed ratio command value Xt indicating a speed ratio in the transmission 7.

When the clutch 5 is turned off in accordance with the clutch command Xc, the hybrid vehicle operates according to the series hybrid type (hereinafter referred to as the "series mode"), while when the clutch 5 is turned on, the hybrid vehicle operates according to the parallel hybrid type ("parallel mode" hereinafter).

Figure 2:
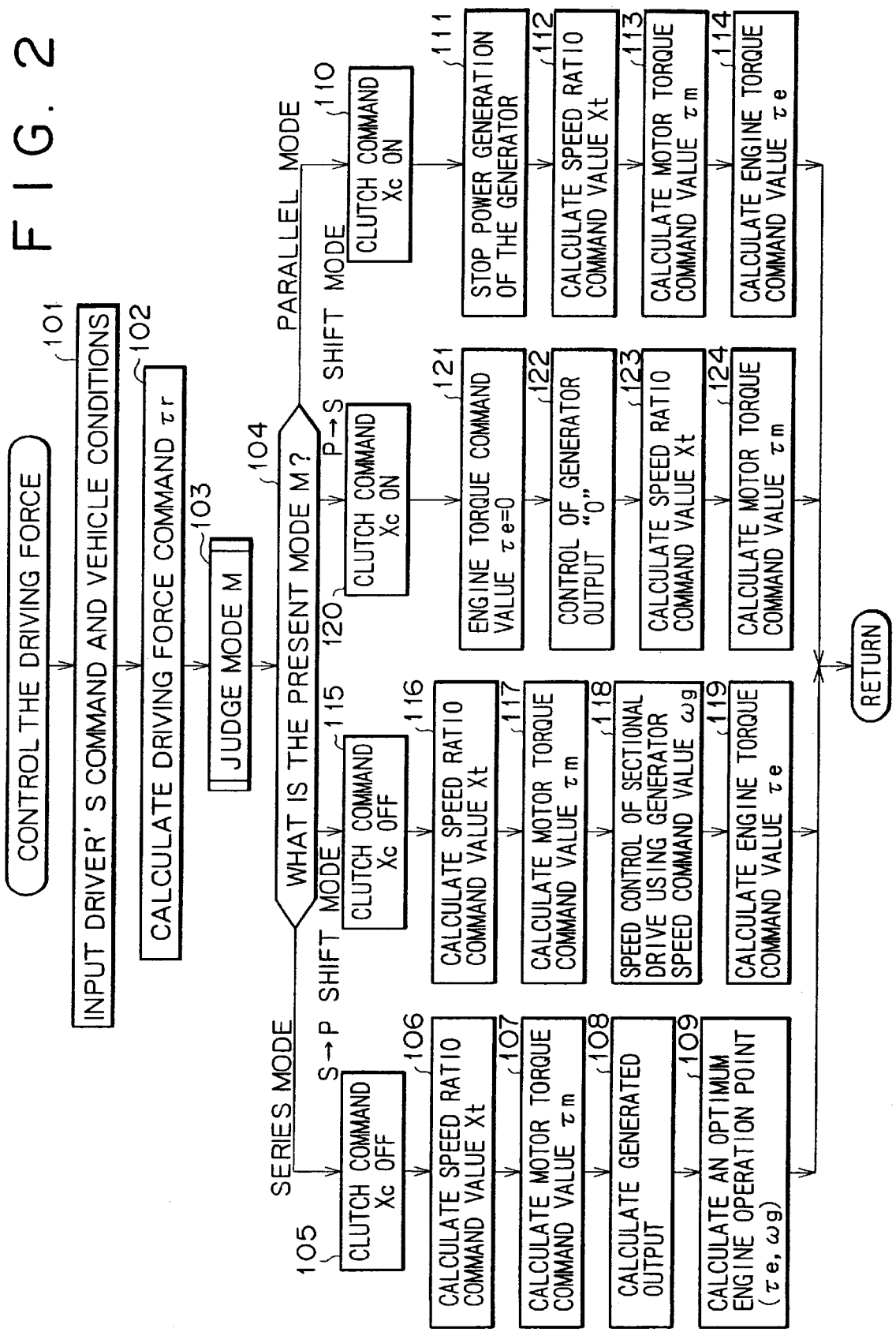
FIG. 2 is a flowchart of a control processing which is executed by a controller used in the hybrid vehicle of FIG. 1.

FIG. 2 is a flowchart of a control processing which the controller 8 executes.

In step 101, the controller 8 inputs an accelerator depression quantity Xa as a driving command from the driver of the vehicle, a brake depression quantity Xb, a vehicle speed V for detecting the condition of the vehicle, a charge quantity Sb, rotational speeds $\omega 1$, $\omega 2$, and clutch temperature T.

Next, in step 102, the controller 8 calculates a driving force command value $\tau r$ intended by the driver, on the basis of the accelerator depression quantity Xa, brake depression quantity Xb and vehicle speed V. The driving force command value $\tau r$ is a controlled variable for deciding an acceleration or deceleration of the vehicle.

In step 103, in accordance with the driving force command value $\tau r$ and the vehicle speed V, the controller 8 judges whether the driving mode is the series mode or the parallel mode. At the time of shift from series mode to parallel mode and from parallel mode to series mode, another processings are required, which are designated S→P shift mode and P→S shift mode, respectively, to make distinction. A more detailed processing of this step will be described later with reference to FIG. 3.

In step 104, on the basis of the mode M judged in step 103, the processing flow branches to the control processing in either the series mode or the parallel mode.

Steps 105 to 109 are executed in the series mode, steps 110 to 114 are executed in the parallel mode, steps 115 to 119 are executed in the S→P shift mode, and steps 120 to 124 are executed in the P→S shift mode.

In the series mode, a rotational energy generated by the engine 1 is converted to an electric energy by the generator 3 to charge the battery 4. Using this electric energy, the motor 6 is driven and generates a driving torque which depends on the speed ratio in the transmission 7.

In step 105, the clutch command Xc is made off to release the clutch 5 and thereafter a speed ratio command value Xt is determined in step 106. In this series mode, the vehicle is driven with only the torque generated by the motor 6, so with the driving force command value $\tau r$ as parameters there is calculated such a speed ratio command value Xt as will afford the highest driving efficiency of the motor 6 and the transmission 7. This processing may be carried out using an optimization table configured beforehand by calculation. The motor torque command value $\tau m$ is determined by both driving force command value $\tau r$ and speed ratio command value Xt and therefore it is calculated and outputted in step 107.

In step 108, an electric power to be generated by the generator 3 is calculated on the basis of both motor input power which is determined by both driving force command value $\tau r$ and vehicle speed V and charge and discharge power in the battery 4 which is determined by the charge quantity Sb. An operation point of the engine 1 corresponding to the best product of the combustion efficiency of the engine and the power generation efficiency of the generator 3 under conditions for generating the electric power in the engine is calculated in step 109. More specifically, an optimum engine torque command value $\tau e$ and a generator speed command value $\omega g$ are determined by calculation.

Then, the torque generated by the engine 1 and the rotational speed of the generator 3 are controlled so as to satisfy the engine torque command value $\tau e$ and the generator speed command value $\omega g$, whereby the engine is operated at this operation point. The generated torque control for the engine 1 is realized by controlling the amount of fuel to be supplied and the rotational speed control for the generator 3 is realized by controlling the field current so as to change the generated output and thereby change the load on the engine 1.

In the parallel mode, the clutch 5 is turned on, whereby the sum of torque generated by the motor 6 and torque generated by the engine 1 is inputted to the transmission 7. This input torque is converted to a vehicle driving force which is determined by the speed ratio in the transmission 7, to drive the vehicle. Since it suffices to determine the speed ratio in the transmission 7 so as to permit driving at an operation point of a high engine efficiency, it is possible to reduce the fuel consumption in high-speed running. Control is made so that a deficiency in the torque generated by the engine 1 is compensated for by the torque generated by the motor 6. For realizing such a way of driving, the controller 8 performs the processings of steps 110 to 114 shown in FIG. 2.

By making the clutch command Xc on in step 110, the clutch 5 is turned on. In order for the generator 3 to assume a state of free running, the controller 8 makes control in step 111 to stop the flow of field current and thereby stop the power generation in the generator 3.

Next, in step 112, a speed ratio command value Xt is determined. In the parallel mode, a driving force is generated by both engine 1 and motor 6, so a speed ratio command value Xt in the transmission 7 corresponding to the highest combined efficiency of both engine 1 and motor 6 is calculated using an optimization table, for example. If the speed ratio command value Xt and the driving force command value $\tau r$ have already been determined, an input torque in the transmission 7 can be obtained in simple manner and therefore the operation required is merely distributing it to the engine torque command value $\tau e$ and the motor torque command value $\tau m$. To this end, in steps 113 and 114, the motor torque command value $\tau m$ and the engine torque command value $\tau e$ are determined so as to bring about the best efficiency of both engine 1 and motor 6.

In the S→P shift mode, the processings of steps 115 to 119 are executed. In this mode, control is made so as not to generate a shock when the clutch is switched over from off to on. Making the clutch command Xc off and calculating the speed ratio command value Xt and motor torque command value $\tau m$ in steps 115 to 117 are of the same processing contents as steps 105 to 107. In step 118, a generator speed command value $\omega g$ is set so that the rotational speeds $\omega 1$ and $\omega 2$ of rotating shafts on input and output sides of the clutch 5 become equal to each other, and thus a speed control of sectional drive is performed.

Next, in step 119, an engine torque command value $\tau e$ is calculated according to the state of charging of the battery 4 and is used to control the engine 1.

Through the above processings the rotational speeds of the rotating shafts on input and output sides of the clutch 5 can be made equal to each other, so by turning on the clutch upon judgment of such coincidence it is possible to make a shift to the parallel mode. By so doing, since there will occur no variation in the driving force, the mode shift can be effected without giving any shock to passengers in the vehicle.

In the P→S shift mode, the processings of steps 120 to 124 are performed. In this mode, for shifting from the parallel mode to the series mode, a control is conducted to make the transfer torque of the clutch 5 zero while keeping the clutch on.

According to this control, after making the clutch command Xc on in step 120, the engine torque command value $\tau e$ is made zero in step 121. In accordance with this command value $\tau e$, the engine 1 stops the supply of fuel and makes the generation of torque zero.

Next, in step 122, a control is made to make the generation of electric power in the generator 3 zero. In the parallel mode, a processing for stopping the generation of electric power is performed for the generator 3 to prevent field current from flowing in the generator 3, whereby it is intended to diminish a loss. But in this step 122, it is desirable that control be conducted to make the generated output of the generator 3 zero while allowing a field current to flow in the generator. The reason is that it is intended to execute a speed control for the generator 3 immediately after switching over to the series mode.

In step 123, a speed ratio command value Xt is calculated. This processing may be of the same contents as step 112 in the parallel mode. In step 124, there is calculated a motor torque command value $\tau m$ which commands a torque to be generated by the motor 6. It is desirable that this value be made equal to the sum of engine torque command value $\tau e$ and motor torque command value $\tau m$ which are obtained in steps 113 and 114 in the parallel mode. By so doing, it is possible to eliminate variations in the driving torque at the time of shift from the parallel mode to the P→S shift mode.

By carrying out the processings of steps 120 to 124 in the P→S shift mode, the driving torque does not vary even upon turning off of the clutch 5 in-reply to zero torque in the engine 1 and zero power in the generator 3. Therefore, if in this state the P→S shift mode is terminated and a shift is made to the series mode, there will not occur any variation in the driving torque, and this is true irrespective of mode.

Figure 3:
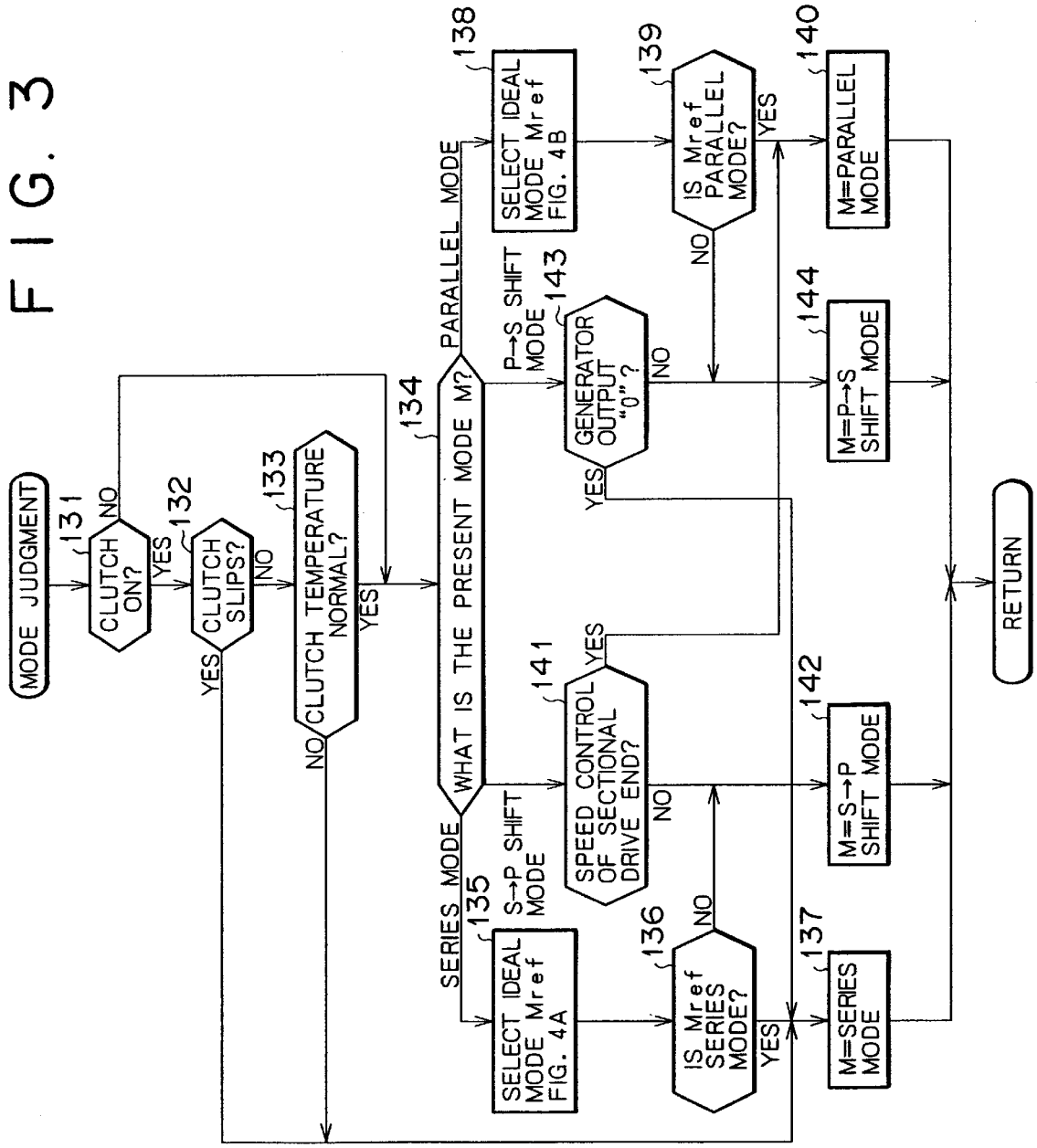
FIG. 3 is a flowchart showing concretely an example of a mode judging process shown in FIG. 2.

Now, with reference to FIG. 3, the following description is provided about mode judgment for determining in what mode a control is to be made. In this mode judgment, there is determined an on-off control for the clutch 5 and therefore also as to preventing the deterioration of driving performance caused by a coupling trouble of the clutch 5 and protection of the clutch, they are realized in this judgment processing.

The processing of step 134 is performed when the clutch 5 is off or in a normal condition. The processing flow is branched on the basis of the present mode M. In the series mode, parallel mode, S→P shift mode, and P→S shift mode, as present modes M, the processings of steps 135, 138, 141 and 143 are to be carried out respectively after branching.

Figure 4A:
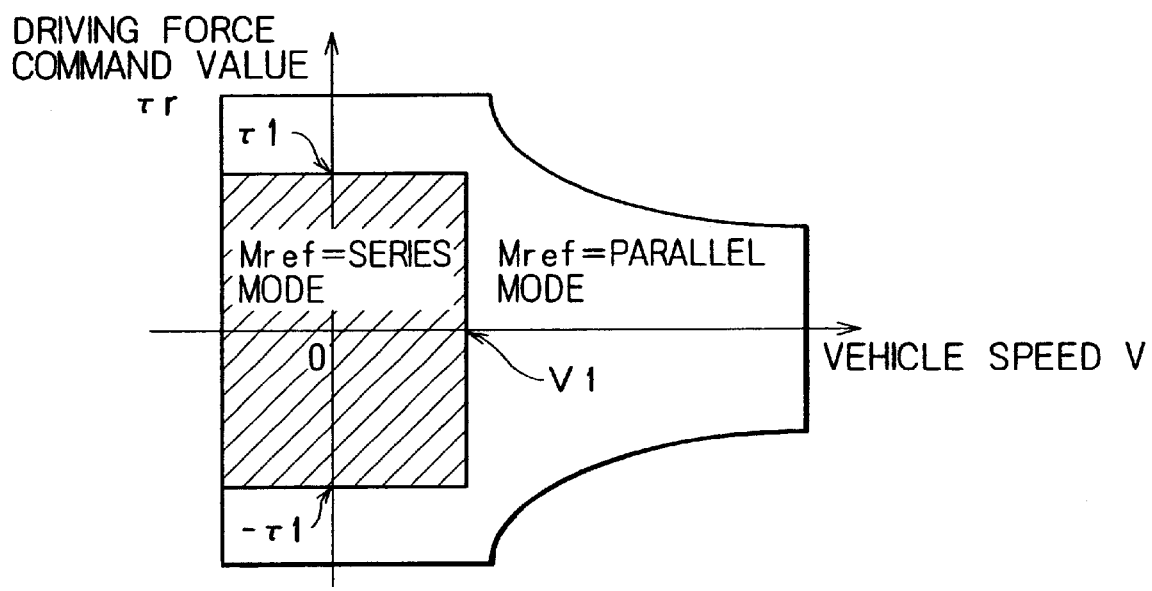

In the series mode, an ideal mode Mref is determined in step 135 on the basis of both vehicle speed V and driving force command value $\tau r$. An example of this determining method will now be described with reference to FIG. 4A. If the vehicle speed V is not larger than a set value V1 and the absolute value of the driving force command value $\tau r$ is not larger than $\tau 1$, the ideal mode Mref is the series mode. In other cases, the ideal mode Mref is the parallel mode.

If the ideal mode Mref is determined to be the series mode in step 136, then in step 137 the mode M is set to the series mode same as the present mode. On the other hand, if the ideal mode Mref is the parallel mode, a jump is made to step 142, in which the mode M is shifted to the S→P shift mode.

Figure 4B:
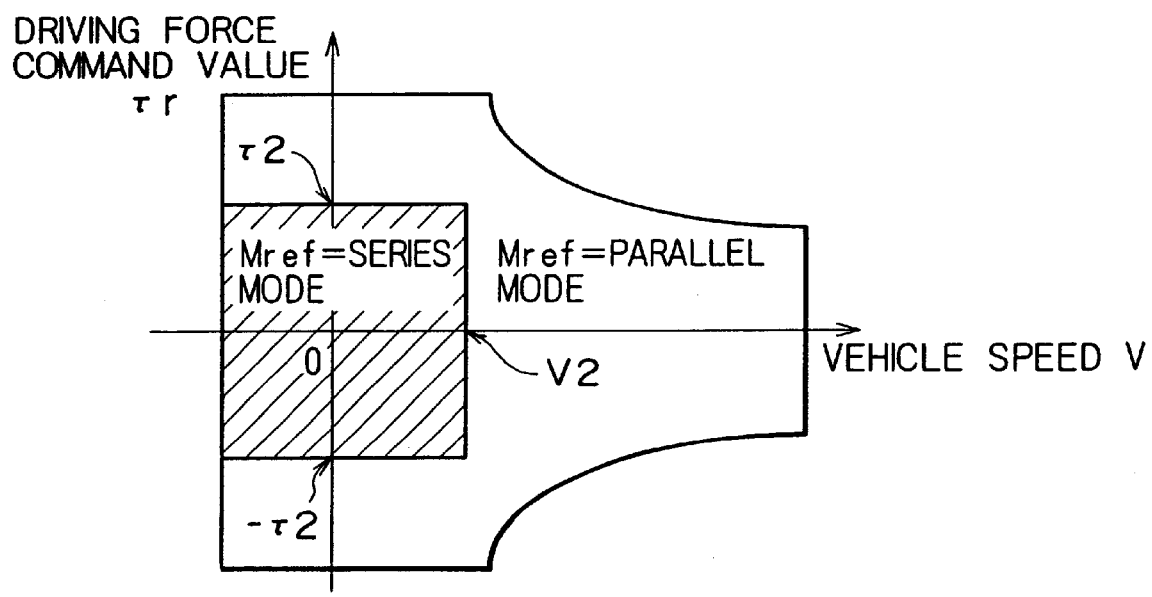

If the present mode M is found to be the parallel mode in step 134, then in step 138 an ideal mode Mref is determined by the method shown in FIG. 4B. According to this method, when the vehicle speed V is not larger than a set value V2 and the absolute value of the driving force command value $\tau r$ is not larger than $\tau 2$, the ideal mode Mref is set to the series mode, while in other cases, the ideal mode is set to the parallel mode. If the set values satisfy the relations of V1>V2 and $\tau 1 > \tau 2$, it is possible to give hysteresis between the series mode and the parallel mode and hence possible to prevent the mode switching operation from being done frequently.

In step 139 there is made judgment as to whether the ideal mode Mref is the parallel mode or not, and if the answer is affirmative, the mode M is allowed to remain in the present parallel mode in step 140. On the other hand, if the ideal mode Mref is the series mode, the mode M is changed to the P→S shift mode in step 144.

If the present mode M is the S→P shift mode, then for avoiding frequent mode switching operations and for maintaining the S→P shift mode until termination of the speed control of sectional drive, there is made judgment in step 141 as to whether the speed control of sectional drive for the input and output shafts of the clutch 5 has been completed or not. If the answer is negative, then in step 142 the mode M is allowed to remain in the S→P shift mode, while if the answer is affirmative, the mode M is shifted to the parallel mode in step 140. In this way, a shift from one mode to another can be done without generating any shock even upon engagement of the clutch 5.

If the present mode N is the P→S shift mode, then in step 143 there is made judgment as to whether the generated output of the generator 3 has become zero or not. If the answer is negative, the mode M is allowed to remain in the present P→S shift mode in step 144, while if the answer is affirmative, a jump is made to step 137, in which the mode M is changed to the series mode. As to the torque generated by the engine 1, it is excluded from judgment conditions because it can be made zero by merely stopping the supply of fuel. If necessary, however, there may be added a processing wherein mode judgment is made by checking whether the engine generated torque has become zero or not in the P→S shift mode.

By making control as above, the engine 1 can be operated at as high efficiency as possible and therefore it is possible to make contribution to the reduction of fuel consumption. However, when the vehicle speed is a medium speed and acceleration and deceleration are repeated frequently, there is the possibility that mode switching will be done frequently. In such a case, a large load is imposed on the clutch 5 by on-off operation of the clutch, with consequent troubles such as overheating caused by friction and coupling trouble (slipping) caused-by wear.

To avoid this inconvenience, the processings of steps 131 to 133 are performed as initial processings in this mode judgment. First, in step 131, it is judged whether the clutch 5 is on or off at present. If the clutch 5 is off, it is judged that there will be no problem, because no load is imposed on the clutch, and the normal processings, which begin with step 134, are performed.

On the other hand, when the clutch 5 is on, a check is made to see if there is any trouble with the clutch. First, in step 132, a comparison is made between the rotational speed $\omega 1$ of the clutch input shaft and the rotational speed $\omega 2$ of the clutch output shaft and judgment is made to see if the clutch is in a state of slip or not. If there is any difference between the rotational speeds $\omega 1$ and $\omega 2$, it follows that the clutch is slipping in its engaged state. This state is judged to be a trouble of the clutch and a jump is made to step 137. In step 137, the mode M is forced to the series mode, in which the clutch 5 is turned off to lighten the load imposed thereon.

If the clutch 5 does not slip in step 132, then in step 133 the temperature of the clutch is checked. When the clutch temperature is judged to be normal from environmental conditions, the normal processing of step 134 is executed. However, when the clutch temperature is high to an abnormal extent in comparison with the environmental conditions, a jump is made to step 137. Also in this case, there is made control to turn off the clutch 5 by changing the mode M forcibly into the series mode. In this way, the vehicle is driven in a mode not using the clutch 5 for the transfer of torque.

By making such a control, it is possible to prevent the clutch 5 from becoming overheated or undergoing a coupling trouble by frequent on-off operation of the clutch. Besides, even in the event of occurrence of a defective coupling, since the hybrid vehicle is driven in the series mode in which the clutch 5 is turned off-in the initial stage, it is possible to prevent deterioration of the driving performance.

In this embodiment, in the event a trouble of the clutch 5 is detected, the hybrid vehicle is driven in the series mode in which the clutch is turned off to make the load (transferred torque) on the clutch zero. However, a modification may be made such that in the parallel mode a portion of the torque generated by the engine 1 is converted to an electric energy by the generator 3 and this electric energy is supplied to the motor 6 to so much increase the torque generated by the motor, thereby lightening the amount of torque (load) transferred by the clutch.

Although a description has been given above about a series-parallel hybrid type vehicle wherein the generator 3 and the motor 6 are disposed respectively before and behind the clutch 5, the present invention is also applicable to the type in which the generator 3 is disposed not on the clutch side of the engine 1 but on the opposite side. Further, the motor 6 may be disposed between the transmission 7 and the wheels 2a, 2b. It goes without saying that the transmission 7 may be either of an automatic step transmission and a continuously variable transmission.

According to the present invention, by making control to lighten the load on the clutch upon detection of a trouble of the clutch, while realizing a low fuel consumption of the engine which is a characteristic feature of the hybrid vehicle, it is possible to prevent deterioration of the driving performance and realize the protection of the clutch.

What is claimed is:
1. A hybrid vehicle including:
an engine for generating a vehicle driving energy;
a clutch for making and breaking the transfer of a mechanical force between said engine and wheels;
a generator which is driven by said engine to generate electric power;
an electric energy storage means for storing a generated output of said generator;
a motor which generates a mechanical driving force and a braking force for the wheels through input and output of energy in said electric energy storage means; and
a controller for controlling operation of said engine, said clutch, said generator, and said motor and for selectively operating the motor and the engine in either a series mode, a parallel mode, or both a series mode and a parallel mode of hybrid vehicle operation of the vehicle,
wherein clutch trouble detecting means for detecting a condition indicative of trouble in said clutch is provided, and when said clutch trouble detecting means has detected a trouble in the clutch, said controller controls an operation of said clutch by operating said motor and said engine only in a series mode in which the clutch is disengaged and the wheels are driven or braked mechanically only by said motor.

* * * * *